(12) United States Patent
Leis et al.

(10) Patent No.: US 7,333,494 B2
(45) Date of Patent: Feb. 19, 2008

(54) OPTIONAL SETTING UP OF A CONNECTION VIA A TELEPHONE NETWORK OR VIA THE INTERNET

(75) Inventors: Peter Leis, Penzberg (DE); Doris Sachsenweger, Munich (DE); Mohammad Vizaei, Boca Raton, FL (US)

(73) Assignee: Siemens Aktiengesellschaft, Munich (DE)

( * ) Notice: Subject to any disclaimer, the term of this patent is extended or adjusted under 35 U.S.C. 154(b) by 1074 days.

(21) Appl. No.: 10/149,672

(22) PCT Filed: Dec. 12, 2000

(86) PCT No.: PCT/EP00/12606

§ 371 (c)(1),
(2), (4) Date: Oct. 28, 2002

(87) PCT Pub. No.: WO01/45373

PCT Pub. Date: Jun. 21, 2001

(65) Prior Publication Data

US 2003/0076836 A1    Apr. 24, 2003

(30) Foreign Application Priority Data

Dec. 15, 1999  (EP) ................... 99125058

(51) Int. Cl.
*H04L 12/28*    (2006.01)

(52) U.S. Cl. ................... 370/395.2; 370/352
(58) Field of Classification Search .............. None
See application file for complete search history.

(56) References Cited

U.S. PATENT DOCUMENTS

| 6,301,609 | B1* | 10/2001 | Aravamudan et al. ...... 709/207 |
| 6,470,010 | B1* | 10/2002 | Szviatovszki et al. ...... 370/356 |
| 6,587,433 | B1* | 7/2003 | Borella et al. .............. 370/230 |
| 6,711,166 | B1* | 3/2004 | Amir et al. ............... 370/395.1 |
| 6,810,033 | B2* | 10/2004 | Derks ........................ 370/352 |
| 6,928,068 | B1* | 8/2005 | Crowe et al. ............... 370/352 |
| 2006/0227957 | A1* | 10/2006 | Dolan et al. ........... 379/212.01 |

FOREIGN PATENT DOCUMENTS

| CA | 2249821 | 4/1999 |
| EP | 0 926 867 A2 | 6/1999 |
| WO | WO 97/47118 | 12/1997 |
| WO | WO 99/14924 | 3/1999 |

OTHER PUBLICATIONS

XP-000720563; "Convergence Between Public Switching and the Internet" by Dr. U. Schoen et al.; World Telecom Congress Proceedings, pp. 549-560, c. 1997.

* cited by examiner

*Primary Examiner*—Phirin Sam
(74) *Attorney, Agent, or Firm*—Bell, Boyd & Lloyd LLP

(57) ABSTRACT

The invention relates, inter alia, to a method according to which a connection is alternately established via a telecommunications network (11) or the internet (34). A user (TlnB) can thus be reached better.

10 Claims, 4 Drawing Sheets

OPTIONAL SETTING UP OF A CONNECTION VIA A TELEPHONE NETWORK OR VIA THE INTERNET

CLAIM FOR PRIORITY

This application claims priority to International Application No. PCT/EP00/12606 which was published in the German language on Jun. 21, 2001.

TECHNICAL FIELD OF THE INVENTION

The invention relates to a system and method for setting up a connection, in which a switching device switches, between subscribers, data transmitted in a first transmission network.

BACKGROUND OF THE INVENTION

A transmission network is, for example, a telephone network for transmitting analog or digital voice data in voice channels, such as a public telephone network. However, transmission networks in which the data to be transmitted is transmitted in data packets are also known. An example of such a transmission network is the Internet, in which voice data is transmitted in data packets according to a protocol which is also referred to as Voice over Internet Protocol, abbreviated to VoIP.

Copper double conductors of the telephone network are used, for example, as the connection route for the first terminal and the second terminal. For the broadband transmission of data on copper double conductors there are various technologies, which are combined under the term xDSL technologies (X Digital Subscriber Line). For example there are HDSL (High Bit Rate Digital Subscriber Line), ADSL (Asymmetrical Digital Subscriber Line) and VDSL (Very High Bit Rate Digital Subscriber Line). Specifically for Internet applications, the Universal ADSL standard has been defined, abbreviated to UADSL or UDSL. With this technology, a personal computer can be installed directly on the copper double conductor without the use of what is referred to as a splitter. The transmission speeds are 1.5 megabit/second.

The document WO 99/14924 discloses a system in which a subscriber utilizes a transmission route to a switching office, either for transmitting data to an Internet or for transmitting data to a public telephone network. During the connection to the Internet, the subscriber cannot be reached via the public telephone network because the transmission route between the switching office and his subscriber connection is seized by the Internet connection. Using the system described in the document WO 99/14924 it is possible to inform the called subscriber about a call, directed to him in the public telephone network, of a calling subscriber by transmitting data in addition to the Internet data. The called subscriber then has the possibility of setting up a connection to the calling subscriber.

The document EP 0 926 867 A2 discloses a possibility of informing a called subscriber of a call of a calling subscriber in a public telephone network if the called subscriber is using the single transmission route to transmit data to an Internet. Further data which contains information relating to the call of the calling subscriber is transmitted to the called subscriber by a switching office to which there is an Internet connection. The called subscriber then has the possibility of accepting or rejecting the call of the calling subscriber.

The document XP-000720563, "Convergence between public switching and the Internet", Dr. U. Schoen, J. Hamann, A. Jugel, Dr. H. Kurzawa, C. Schmidt; Siemens AG—Germany, discloses how broadband transmission routes are used to transmit data to a subscriber. These broadband transmission routes make it possible to transmit large amounts of data between a switching device and the subscriber terminals. In particular this is advantageous for transmitting in a reasonable amount of time the large amounts of data which are usually to be transmitted in the case of Internet connections. This document indicates possibilities of how existing elements of a public telephone network can be upgraded in order to achieve better data transmission of Internet data.

SUMMARY OF THE INVENTION

The invention relates to a system and method for setting up a connection, in which a switching device switches, between subscribers, data transmitted in a first transmission network according to a first transmission method. A first terminal is connected to the switching device via a connection route. A second terminal, by means of which data is transmitted in a second data transmission network according to a second transmission method which differs from the first transmission method, is connected via the same connection route.

The invention discloses a system and method which permits the use of additional performance functions for the operation of two terminals using various transmission networks on a connection route. In this context, a switching device and an associated program are also specified.

In one embodiment of the invention, a called subscriber can be reached simultaneously via two transmission networks. As in the above-mentioned xDSL technologies, two transmission networks are used in order to be able to utilize the advantages of both transmission networks. Two transmission networks are, for example, also in a transition phase from the use of the one transmission network to the use of the other transmission network alongside the first one. The fact that the same subscriber can simultaneously be reached via two terminals provides the possibility of offering the subscriber new performance functions and/or of increasing the accessibility to the subscriber further.

In another embodiment according to the invention, during the processing of a request for the setting up of a connection to the first terminal, a control unit of the switching device determines a connection destination via which the second terminal can be reached in the second transmission network. During the processing of the request, a connection is set up to the second terminal using the connection destination. By including the second terminal in the processing of a request, which has actually been generated for the first terminal, the request can be processed in an intra-network fashion. The second terminal, for example, is thus included if the first terminal is seized or its function is faulty. As a result, the accessibility to the subscriber with whom the two terminals connected via the same connection route are associated is increased. During the processing of the request, there is an additional transmission possibility in comparison with the processing of the request in one data transmission network. The additional transmission possibility can be used as an alternative or in addition to the transmission possibility which has already been used until now.

The invention largely remains concealed from the caller. The destination switching device at the called subscriber's end is, however, an exception. Consequently, it is not necessary to change protocols for transmitting signaling messages between the determining devices. It is also not necessary to send any additional messages between the switching devices.

In still another embodiment according to the invention, different transmission services are used, for example for the transmission of voice data, for the transmission of facsimile data or the transmission of user files. If, for example, a telephone device of the called subscriber is seized, the invention can be used for setting up a further connection to the subscriber via the Internet. Likewise, when a fax device is seized it is possible to call upon a service provider computer (server) which nevertheless receives the incoming fax for the subscriber.

In one aspect, using the connection to the second terminal, an enquiry is made as to whether a connection is to be set up and/or via which transmission network the connection is to be set up. If the second terminal has, for example, better presentation possibilities for the enquiry than the first terminal, the enquiry can be made in a more user-friendly way than when the first terminal is used for the enquiry. In this way, telephones, for example, become difficult to operate owing to the large number of functional keys. On the other hand, an enquiry can easily be presented in a dialog box on the screen of a computer.

In another aspect, using the connection to the second terminal, a connection is set up to the terminal which has generated the request. This requires the second terminal to be suitable for processing the service which the request relates to. A voice connection to a remote subscriber can be set up, for example, both via the telephone network and with the involvement of the Internet.

In still another aspect, the control unit checks whether a condition for the involvement of the second terminal is fulfilled. The connection to the second terminal is set up if the condition is fulfilled. For example, the seizure state of the first terminal is interrogated. The second terminal is involved in the processing of the request if the first terminal is seized. Methods in which the control unit involves the second terminal if the subscriber does not respond at the first terminal are also applied.

Although the first terminal and second terminal are arranged on the same connection route and thus spatially near to one another, there may be situations in which the subscriber does not respond at the first terminal but wishes to set up a connection at the second terminal. Such a case is, for example, a defective first terminal.

In another embodiment according to the invention, a transmission network is a through-switching transmission network for voice transmission, for example the digital ISDN network (Integrated Services Network) with analog and digital terminals. The other transmission network is a network, for example the Internet or an Intranet, in which data is transmitted in data packets. The transmission network is changed either during the processing of a request in the through-switching transmission network or during the processing of a request in the transmission network which switches data packets. There is often a telephone network connection and an Internet connection at the subscribers' premises.

In a preferred embodiment according to the invention, connection routes are used on which data is transmitted according to xDSL technologies, in particular with methods using the UADSL technology. The large number of such connection routes justifies the expenditure in the switching device for the execution of the method.

The switching device according to the invention may also include a first connection unit for connection to the first transmission network and a second transmission unit for connecting the first terminal of the subscriber. Furthermore, the switching device includes a control unit which performs the method.

In one aspect of the switching device according to the invention, the second connection unit is also used to connect the second terminal. The common connection route for the first terminal and the second terminal leads to the switching device. Within the connection unit, the data relating to the first terminal and the second terminal are separated from one another, for example using a frequency filter, as is known from the above-mentioned UADSL technology.

In one embodiment, the switching device also includes a network interworking unit which connects the first data transmission network and the second transmission network. In order to actuate the network interworking unit, a protocol which is defined for the switching device can be used. It is thus signaled over a short distance.

If the switching device also includes a network access unit for the access by the second terminal to the second transmission network, a protocol which is defined for the switching device can also be used for the signaling between network access unit and the switching device. As a result, the setting up of the switching device according to the invention can be simplified.

The invention also relates to a program for setting up a connection, during whose execution the above-mentioned method according to the invention or its developments are executed.

In another embodiment of the invention, there is a program for a data processing system, the data processing system is made to output an interrogation with which an operator is requested to set up a request, directed to the data processing system, to set up a connection via a first transmission network or via a second transmission network. The request is made, for example, by means of a display unit or audibly. During the execution of the program according to the invention, the operator is provided with the possibility of deciding, before the connection set-up, whether the second transmission network is to be used. Undesired disruption to the operator by a second connection set-up can thus be avoided. On the other hand, the accessibility to the operator is increased.

BRIEF DESCRIPTION OF THE DRAWINGS

Exemplary embodiments of the invention are explained below with reference to the appended drawings, in which.

DETAILED DESCRIPTION OF THE PREFERRED EMBODIMENTS

Figure 1:
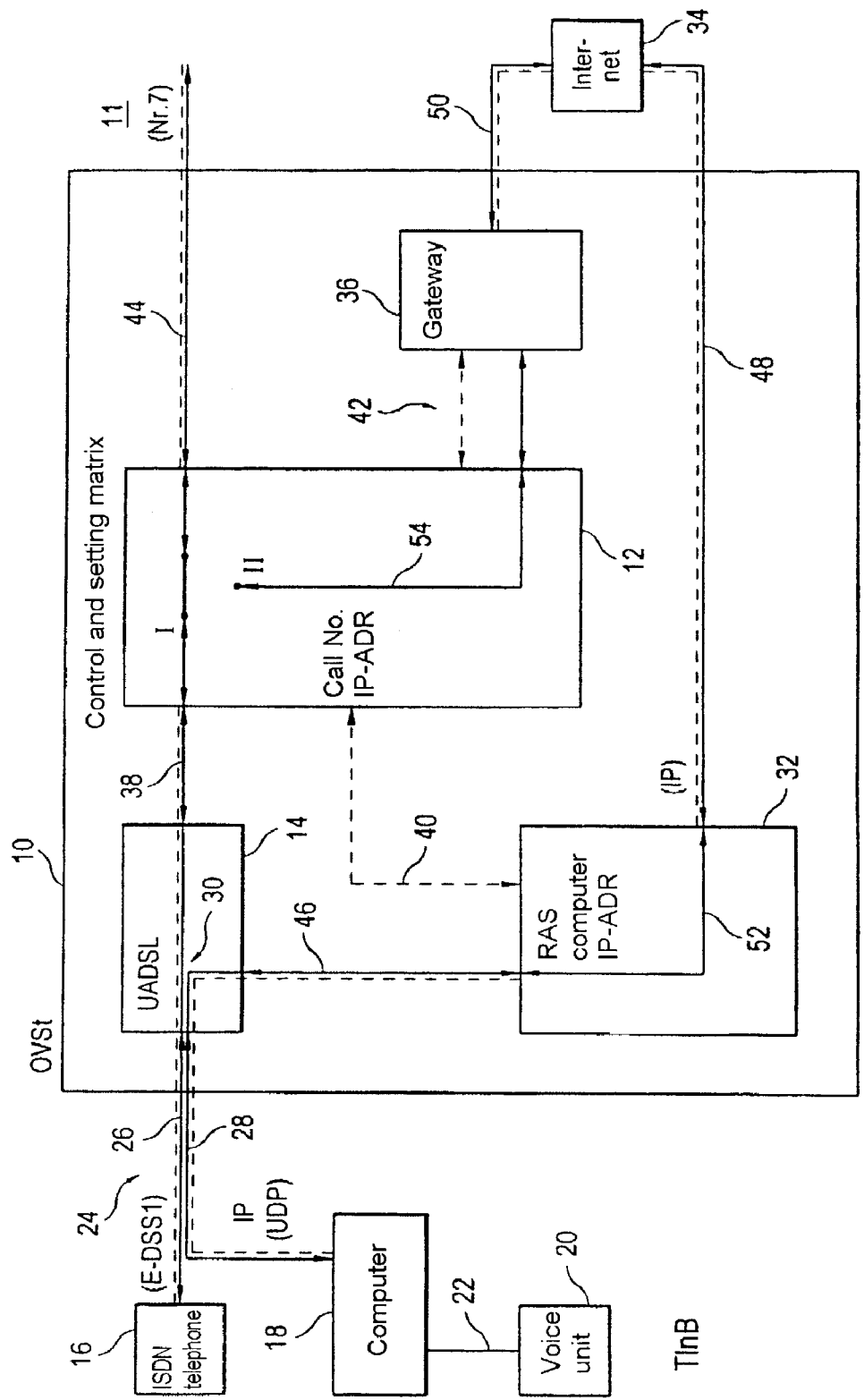
FIG. 1 shows the set-up of a switching office.

FIG. 1 shows the set-up of a local switching office 10, such as is used, for example, in the telephone network 11 of TELEKOM AG. The switching office 10 contains a control and switching unit 12, which controls the connection set-up and connection release, and switches connections between voice channels in a switching matrix (not illustrated).

A connection module 14 of the switching office 10 is used to connect subscriber terminals, of which two terminals 16, 18 of the same subscriber TlnB are illustrated in FIG. 1. The terminal 16 is an ISDN telephone (Integrated Systems Digital Network). In another exemplary embodiment, a telephone which operates with analog technology is used. The terminal 18 is a workstation computer on which application programs are executed, for example an accounting program and a program for Internet telephone services. For example, the "Netmeeting" program from Microsoft GmbH is used for Internet telephone services. A voice unit 20 is connected to the computer 18 using a line 22. The voice unit 20 is, for example, a headset/microphone combination with which voice signals are input into the computer 18 and with which voice signals generated by the computer 18 can be made audible.

The telephone 16 and the computer 18 are connected to the connection module 14 via the same line 24. The above-mentioned UADSL technology is used as the transmission technology. A lower frequency range is used as the transmission route 26 for the data to be transmitted from and to the telephone 16, the data being transmitted in said frequency range according to the PCM (Pulse Code Modulation) standard. A higher frequency range is used as the transmission route 28 for the transmission of data between the computer 18 and the connection module 14.

Dashed lines indicate signaling protocols between the telephone 16 and the switching office 10, and between the computer 18 and the switching office 10, respectively. The subscriber signaling protocol E-DSS1 (Euro-Digital Signaling System One) is used as the signaling protocols between the telephone 16 and the connection module 14. In the case of telephones with analog technology, signaling signals are generated by suitable circuits in the telephone, for example by pulse generators for the dialing pulses. Data is transmitted on the transmission route 28 according to the Internet Protocol IP. The UDP protocol (User Datagram Protocol) is used for the signaling.

The connection module 14 includes a frequency filter with which the data coming from the telephone 16 and from the computer 18 are separated. On the other hand, the data which is to be transmitted to the telephone 16 and to the computer 18, respectively, is combined in the connecting module 14, on the line 24.

The switching office 10 also includes a network access computer 32 which can be used to set up connections to the Internet 34. A network interworking computer 36 which is included in the switching office 10 is an interface between the Internet 34 and the telephone network 11.

The control and switching unit 12 is connected via an internal bus for the switching office 10 to the connection module 14, the network access computer 32 and the network interworking computer 36, cf. connections 38, 40 and 42. Signaling data and useful data is transmitted via a connecting line 44 between the control and switching unit 12 and an adjacent switching office (not illustrated). The signaling protocol No. 7 according to the CCITT standard (Comité Consultatif International Télégraphique et Téléphonique) is used as the signaling protocol on this line. The connection module 14 is connected to the network access computer 32 via a connection 46. The network access computer 32 and the network interworking computer 36 are connected to the Internet 34 via connecting lines 48 and 50, respectively. Dashed lines along the connections 38 to 42, the connecting line 44, the connection 46 and the lines 48, 50 indicate signaling. Unbroken lines show the transfer of useful data. The transmission routes operate bidirectionally, i.e. both the signaling data and the useful data are transmitted in both directions.

The control and switching unit 12 sets up a connection, in a switched position I, in the telephone network 11 to the telephone 16. Here, the line 24, the connection module 14, the connection 38 and the connecting line 44 are used to transmit the voice data. In a switched position II, the control and switching unit 12 switches a connection between a terminal in the telephone network and the computer 18. The computer 18, the transmission route 28, the connection module 14, the connection 46, a connection 52 in the network access computer 32, the line 48, the Internet 34, the line 50, the network interworking computer 36, a connection 54 in the control and switching unit 12 and the connecting line 44 are used for the connection.

The selection of the switched position I or II is explained below with reference to FIGS. 2, 3A and 3B. With respect to the individual details of the signaling operations during the setting up of a connection by means of the switched position I or II, reference is made to the above-mentioned signaling protocols.

Figure 2:
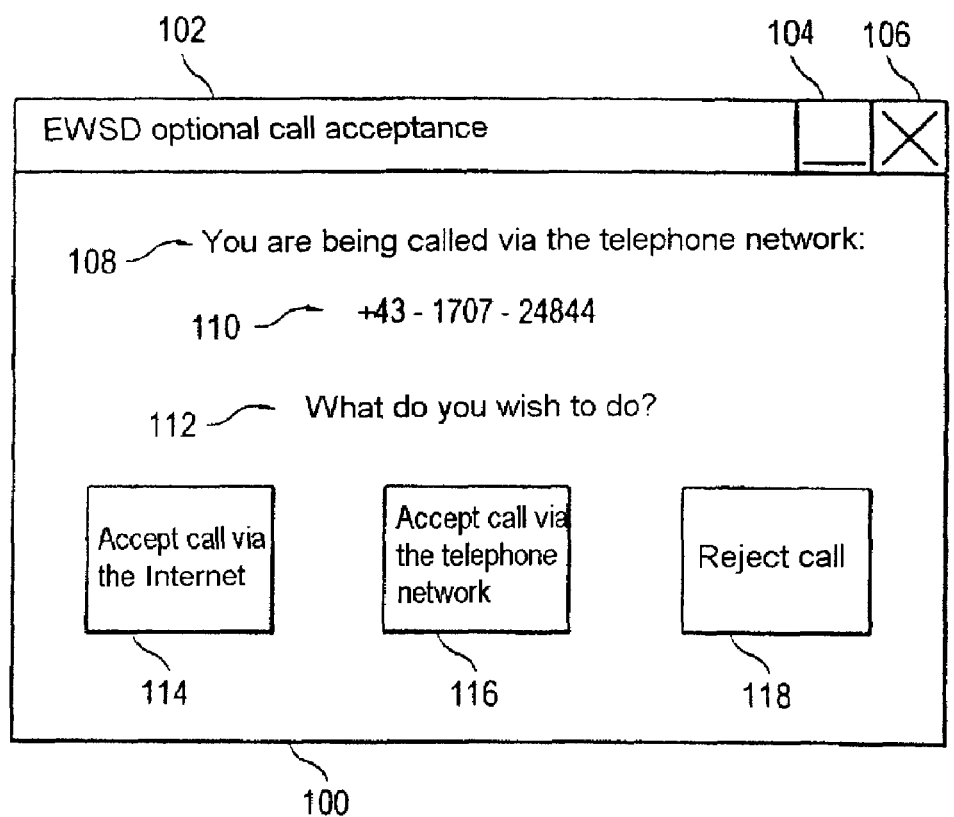
FIG. 2 shows a dialog box for optionally accepting a call.

FIG. 2 shows a dialog box 100, which is displayed on a display unit of the computer 18 before a connection is set up to the subscriber TlnB. The dialog box 100 contains a title bar 102, a minimize box 104, a closing box 106, text lines 108, 110 and 112 and buttons 114, 116 and 118.

The title bar 102 includes an indication of the switching office 10 used and of the feature to which the dialog box 100 relates, namely "EWSD—optional call acceptance" (electronically controlled digital dialing system from SIEMENS AG). The minimize box 104 causes the dialog box 108 to be represented in minimized form at the lower edge of the screen when it is clicked on with a computer mouse. The closing box 106 is used to close the dialog box 100. The text line 108 indicates to the reader, for example the subscriber TlnB, that he is being called by another subscriber TlnA (not illustrated) via the telephone network. The call number of the calling subscriber TlnA, here the call number "+43-1707-24844", is represented in the text line 110. The text represented in the text line 112 is an enquiry as to what will be done as the next step. If the subscriber TlnB actuates the button 114, the incoming call is received via the Internet 34, cf. FIG. 1. On the other hand, if the subscriber TlnB actuates the button 116, the incoming call is set up via the telephone network 11, i.e. the telephone 16 is used. The button 118 is actuated by the subscriber TlnB if he wishes to reject the incoming call.

Figure 3A:
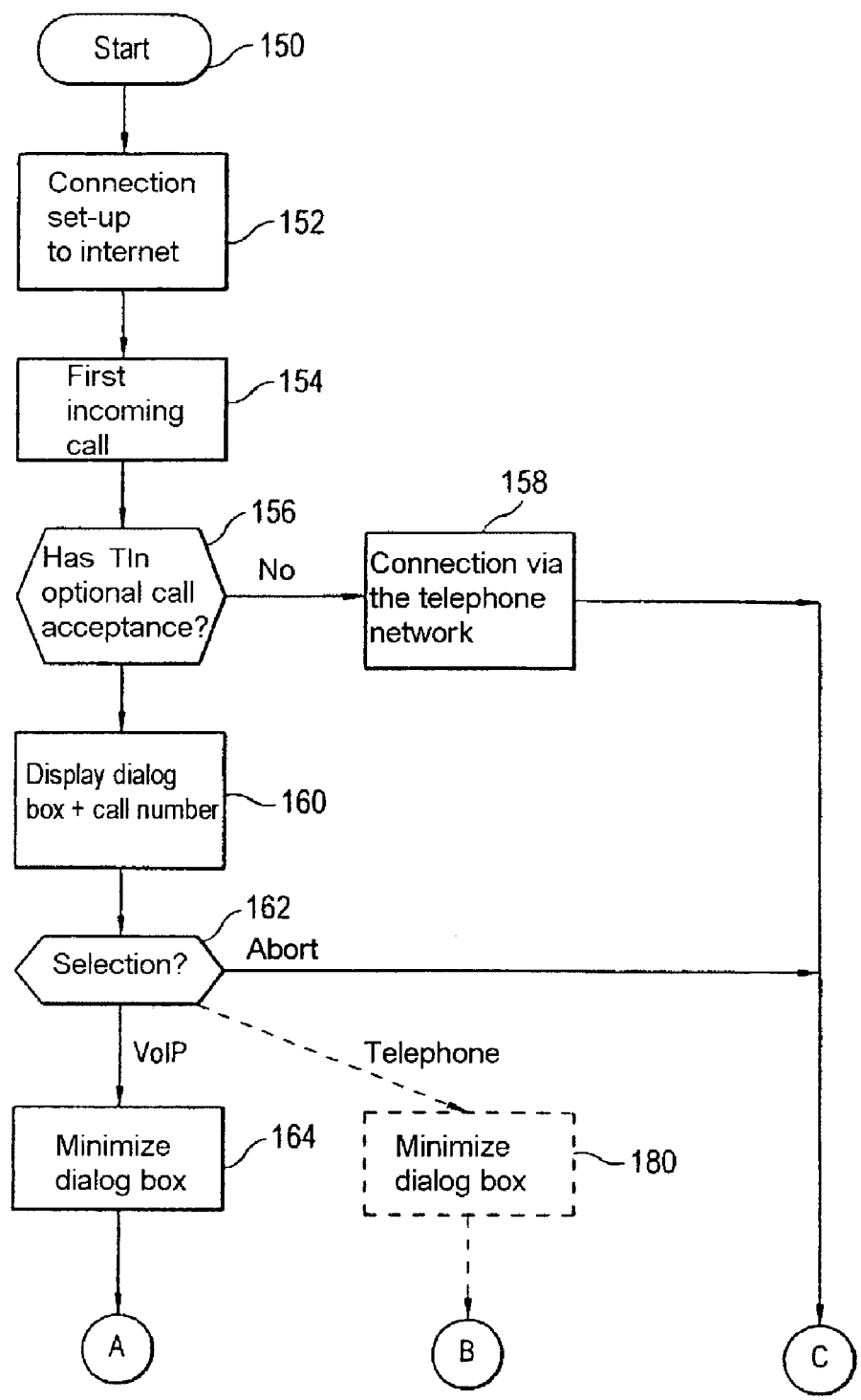
FIGS. 3A and 3B show a flowchart for a method for optionally accepting a call.
Figure 3B:
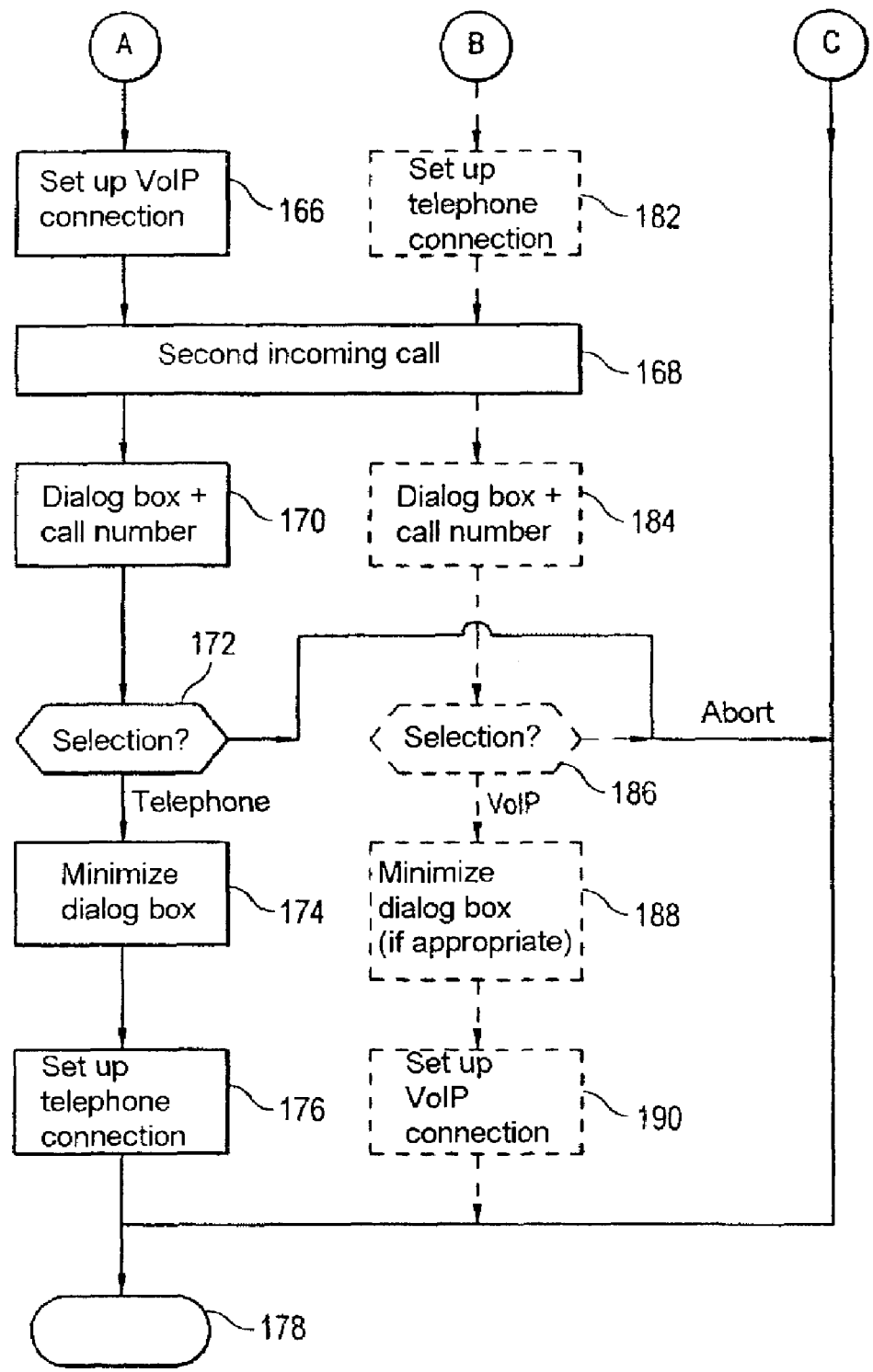

FIGS. 3A and 3B show a flowchart for a method for optionally accepting a call via the Internet 34 or via the telephone network 11, cf. FIG. 1. The method begins at 150. In 152, the subscriber TlnB sets up an Internet connection to the network access computer 32. An Internet address IP-ADR at which the subscriber TlnB can be reached on the Internet 34 is stored in the network access computer 32.

This Internet address IP-ADR is to be given, for example, if an electronic mail is sent to the subscriber TlnB. The Internet address IP-ADR is also to be given in the case of a telephone connection via the Internet.

The Internet address IP-ADR is signaled by the network access computer 32 to the control and switching unit 12 via the connection 40. When the "optional call acceptance" feature is installed, it is indicated that the call number of the subscriber TlnB and the Internet address IP-ADR of this subscriber TlnB are to be used for the feature. The call number and the Internet address of the subscriber TlnB remain stored in the control and switching unit 12.

In 154, a call request is signaled from an adjacent switching office via the connecting line 44. The call number of the subscriber TlnB is specified in the request as the destination call number. The incoming call is also referred to as first call below.

In 156, the control unit 12 checks whether the subscriber TlnB specified in the request has installed the "optional call acceptance" service feature. In order to install it, the method ISCI (Internet Subscriber Controlled Input), for example, was used. If the subscriber TlnB has not installed the "optional call acceptance" service feature, the control and switching unit 12 sets up a through-switched telephone connection to the telephone 16 by means of the switched position I, cf. 158. After the execution of the 158, the method is terminated, cf. 178 explained below.

If, on the other hand, it is detected in 156 that the subscriber TlnB has installed the "optional call acceptance" service feature, 156 is directly followed by 160. In the method step 160, the displaying of the dialog box 100, cf. FIG. 2, on a display unit of the computer 18 is brought about. The control and switching unit 12 signals to the network access computer 32 via the connection 40 that the dialog box 100 is to be displayed. The network access computer 32 brings about the displaying of the dialog box 100 on the display unit of the computer 18 using the above-mentioned protocol UDP. Here, the call number of the calling A subscriber TlnA is also sent to the network access computer 32 by the control and switching unit 12. This call number is included in the request to be processed. The call number is transmitted to the computer 18 by the network access computer 32 via the connection 46 and the transmission route, and displayed on the line 110 of the dialog box 100.

In 162, the subscriber TlnB makes a selection and actuates one of the buttons 114 to 118. The selection of the subscriber TlnB is signaled by the computer 18, via, inter alia, the connection 46, to the network access computer 32 and from there to the control and switching unit 12 via the connection 40. The protocol UDP is used on the line 24 for this. If the subscriber TlnB actuates the button 118, the method is terminated without accepting the call, cf. 178. If, on the other hand, the button 114 is actuated, 162 is directly followed by 164.

In 164, the button 114 is disabled so that it can no longer be actuated for the time being. The disabling is indicated on the display of the dialog box 100 by a certain gray color of the button 114.

After 164, the setting up of a voice connection via the Internet is brought about by the control and switching unit 12 in 166. The Internet address IP-ADR which is associated with the call number of the subscriber TlnB is specified as the connection destination. It is signaled to the network interworking unit 36, via the connection 42, that a connection is to be switched between the telephone network 11 and the Internet 34. After it has been determined that the network interworking unit 36 still has free resources, the connection is switched to the network interworking unit 36 by means of the switched position II. In the network interworking unit 36, the voice data which is transmitted in the voice channels is divided up into data packets and passed on to the Internet 34 in accordance with Internet protocol. The packeted voice data then passes from the Internet 34 to the network access computer 32 because the Internet address IP-ADR of the subscriber TlnB was specified as the connection destination before the setting up of the connection in the Internet. The network access computer 32 passes the packeted voice data on to the computer 18 via the connection 52. In the computer 18, the voice data is output using the voice unit 20. The voice of the subscriber TlnB passes in the opposite direction via the voice unit 20, the computer 18, etc. to the network interworking unit 36 and from there to the remote subscriber TlnA (not illustrated) in the telephone network 11.

In 168, a further request for a second incoming call, which contains the call number of the subscriber TlnB, is received on the connecting line 44. In 170, the displaying of the dialog box 100 is brought about on the display unit of the computer 18, as already explained above for 160. The subscriber TlnB can now actuate the button 116 or 118. The call number of the second calling subscriber is indicated on the text line 110. If the subscriber TlnB decides to reject the second call, he activates the button 118 in 172. The method is terminated, cf. 178. If, on the other hand, the subscriber TlnB actuates the button 116 in 172, 174 follows directly after.

In 174, the control and switching unit 12 causes, with the involvement of the network access computer 32, the button 116 also to be disabled and displayed in gray the next time the dialog box 100 is displayed.

Owing to the selection of the subscriber TlnB in 172, a telephone connection is set up for the second incoming call in 176. This connection is switched to the telephone 16 via the switched position I.

In 178, the method is terminated. After the release of the connection which has come about owing to the first call, the button 114 is enabled again. Likewise, after the release of the connection brought about by the second call, the button 116 is enabled again. The subscriber TlnB therefore has the possibility, in the case of further incoming calls, to set up a voice connection via the Internet 34 or via the telephone network 11.

However, if the subscriber TlnB decides, in 162, to actuate the button 116, 162 is followed directly by 180 in which the button 116 is disabled. 180 is followed by 182.

In 182, a telephone connection is first switched via the telephone network 11. This means that the connection to the telephone 16 is set up by means of the switched position I.

If the second incoming call arrives at the switching office 10 in 168, the dialog box 100 is displayed in 184. The button 116 is disabled here. If the subscriber TlnB presses, in 186, the right-hand button, i.e. the button 118, the method is terminated, cf. 178. The second incoming call is therefore not accepted.

If, on the other hand, the subscriber TlnB actuates the button 114 in 186, this button is deactivated in a directly following 188 if no more than one voice connection is to be set up to the subscriber TlnB via the Internet 34. In 190, the setting up of a voice connection via the Internet 34 is brought about. A connection is set up to the computer 18 by means of the switched position II here.

The invention claimed is:

1. A method for setting up a connection, comprising:
    switching data with a switching device, transmitted in a first transmission network according to a first transmission method, between subscribers;
    connecting a first terminal to the switching device via a first transmission route of the connection route;
    transmitting data using a second terminal, in a second data transmission network according to a second transmission method connected via a second route of the connection route;
    setting up at least one connection to the first terminal and at least one connection to the second terminal via the first and second transmission routes of the connection route, such that, during the processing of a request for the setting up of the at least one connection to the first terminal, a control unit of the switching device determines a connection destination via which the second terminal can be reached in the second transmission network via the second transmission route, such that, during the processing of the request, the at least one connection is set up to the second terminal via the second transmission route using the connection destination;

wherein one of the first and second transmission networks is a through-switching transmission network for voice transmission and the other of the first and second transmission networks is a transmission network in which data is transmitted in data packets; and wherein using the at least one connection to the second terminal, an enquiry is made to determine whether the at least one connection is to be set up and/or via which transmission network the at least one connection is to be set up.

2. The method as claimed in claim 1, wherein using the at least one connection to the second terminal, the at least one connection is set up to a terminal which has generated the request.

3. The method as claimed in claim 1, wherein the control unit checks whether a condition for involvement of the second terminal is fulfilled, and the connection to the second terminal is set up if the condition is fulfilled.

4. The method as claimed in claim 1, wherein data is transmitted over the connection route in broadband.

5. A switching device for optionally setting up a connection, comprising:
   a first connection unit to connect a first transmission network in which data is transmitted according to a first transmission method;
   a second connection unit to connect a connection route for a first terminal; and
   a control unit to process requests for the setting up of the connection to the first terminal, via a first transmission route of the connection route, wherein
   the control unit includes a device to determine a connection destination which, during the processing of a request, determines the connection destination via which a second terminal, which is connected via a second transmission route of the connection route and which transmits data in a second transmission network according to a second transmission method is reached,
   at least one connection is set up to the first terminal and the second terminal via the transmission routes of the connection route, and
   the switching device includes a unit to set up the at least one connection to the second terminal which sets up the connection using the connection destination;
   wherein one of the first and second transmission networks is a through-switching transmission network for voice transmission and the other of the first and second transmission networks is a transmission network in which data is transmitted in data packets; and
   wherein using the connection to the second terminal, an enquiry is made to determine whether the at least one connection is to be set up and/or via which transmission network the connection is to be set up.

6. The switching device as claimed in claim 5, wherein the second connection unit is used to connect the second terminal which is reached at the connection destination.

7. The switching device as claimed in claim 5, further comprising a network gateway to connect the first transmission network and the second transmission network.

8. The switching device as claimed in claim 5, further comprising a network access unit to configure access from the second terminal to the second transmission network.

9. The switching device as claimed in claim 5, wherein the second connection unit operates according to a method in which data is transmitted in broadband.

10. A program for setting up a connection, having an instruction sequence which can be executed by a processor of a switching device in a first transmission network, such that, when the instruction sequence is executed, the switching device is made to execute the following:
    switching data with a switching device, transmitted in a first transmission network according to a first transmission method, between subscribers;
    connecting a first terminal to the switching device via a first transmission route of the connection route;
    transmitting data using a second terminal, in a second data transmission network according to a second transmission method connected via a second route of the connection route; setting up at least one connection to the first terminal and at least one connection to the second terminal via the first and second transmission routes of the connection route, such that, during the processing of a request for the setting up of the at least one connection to the first terminal, a control unit of the switching device determines a connection destination via which the second terminal can be reached in the second transmission network via the second transmission route, such that, during the processing of the request, the at least one connection is set up to the second terminal via the second transmission route using the connection destination;
    wherein one of the first and second transmission networks is a through-switching transmission network for voice transmission and the other of the first and second transmission networks is a transmission network in which data is transmitted in data packets; and
    wherein using the at least one connection to the second terminal, an enquiry is made to determine whether the at least one connection is to be set up and/or via which transmission network the at least one connection is to be set up.

* * * * *